LIMITING OXYGEN CONTENTS FOR POLYETHYLENES CONTAINING HALOGENS

3,751,454
BIS-GUANIDIUM TETRACHLOROPHTHALATE AND TETRABROMOPHTHALATE AND PROCESS FOR MAKING SAME

Satoyuki Minami, Otsu-shi, Masateru Nakoji, Moriguchi-shi, and Toshikazu Aoki, Otsu-shi, Japan, assignors to Toray Industries, Inc., Tokyo, Japan
Filed Jan. 30, 1969, Ser. No. 795,252
Claims priority, application Japan, Feb. 12, 1968, 43/8,359
Int. Cl. C07c *123/00*
U.S. Cl. 260—501.14                                    1 Claim

ABSTRACT OF THE DISCLOSURE

Bis-guanidium tetrachlorophthalates and bis-guanidium tetrabromophthalates and processes for obtaining same by interaction of an inorganic acid salt of guanidine and tetrachlorophthalic anhydride or tetrabromophthalic anhydride or an alkali metal salt of tetrachlorophthalate or tetrabromophthalate.

---

The present invention relates to a novel guanidium compound suitable as a flame retardant agent and a process for the preparation thereof.

More particularly, the present invention relates to bis-guanidium tetrabromophthalate or bis-guanidium tetrachlorophthalate and a process for the preparation thereof.

Because of their characteristic excellent mechanical properties, electric characteristics, moisture resistance and chemical stability, thermoplastic resins such as resins of the polyolefine series, resins of the polyester series, resins of the acrylic series, resins of the polystyrene series and ABS resins have come to be used in large amounts for various uses. Generally, however, they have disadvantages by virtue of being inflammable. Because this disadvantage is particularly apparent in a use especially requiring non-inflammability, such as in refractory buildings, and despite having excellent adiabatic properties and moisture resistance, these thermoplastic resins have to be restricted for use as building materials.

Heretofore, various processes have been proposed for improvement of non-inflammability, and as a general process it is known that a mixture of chlorinated paraffin and antimony oxide is effective. However, the mixture according to this prior process lowers the softening point of the resin composition and noticeably impairs mechanical properties, such as tensile strength and elongation. The useful scope thereof has thus been self-limiting. Especially, in a chlorine-containing compound, in order to produce a non-inflammable effect, a large amount of said mixture has to be added and there is an adverse effect on the softening temperature and a rise in the temperature at which the material becomes brittle. Especially, when these thermoplastic resins are made into a multicellular moulded article, there is a disadvantage in that, unless a large amount (not less than 40% by weight) of the mixture is added, a satisfactory non-inflammable effect cannot be obtained. Moreover, when the period of use is long, chlorinated paraffin exudes on the surface of the thermoplastic resin and dust attachments increase, and there is a disadvantage of noticeably damaging the appearance. Besides the aforementioned representative example of a non-inflammable agent (combination of chlorinated paraffin and antimony trioxide), it is known that use of a kind of compound containing halogen, e.g., tetrabromobutane, tribromoaniline and hexabromobenzene and a kind of compound containing phosphorus, e.g., tris ($\beta$-chloroethyl) phosphate and tris (2-bromoethyl) phosphate, or antimony trioxide, either alone or in admixture with at least two of the above, is effective. As a halogen in a halogen-containing compound, generally chlorine and bromine are used, of which the effect of bromine is large, as is known. However, in a non-inflammable agent containing a halogen, mere high content of a halogen in that substance does not necessarily result in a large non-inflammability imparting effect. Also, mere high content of a halogen in the final product of a resin composition does not necessarily result in a large non-inflammability effect. Also, such a compound must pass strict requirements of tending to mix with the thermoplastic resin used, namely, compatibility is good, heat resistance at the time of mixing is good. There is no separation of the halogen and no coloring. Especially, when a cellular article is produced, because there is a foaming step at a temperature higher than that of mixing (the compound will not melt and decompose by heat at least until 280° C.), it is necessary that the compound be a non-inflammability imparting agent having good heat resistance and heat stability at higher temperatures.

Accordingly, as compounds exhibiting non-inflammability imparting effects, the same as that of the compounds of the present invention, a few kinds of bromine compound are known. However, as shown in the examples, there are problems in mixing properly with the resin, and in heat stability at the time of mixing and foaming. For instance, a bromine compound of an aliphatic compound such as tetrabromobutane has generally a low melting point and bromine separates out at a low temperature and this presents a problem. From the viewpoint of separation of bromine, a bromine compound of an aromatic compound is preferable. However, tribromoaniline and hexabromobenzene have disadvantages because of noticeable sublimation. Tetrabromophthalic anhydride, a bromine-containing component used in making the novel compound of the present invention, is excellent in non-inflammability imparting effect, but bromine begins to separate in the vicinity of 230° C. and it has a melting point of 279° C.

Besides these, as non-inflammability imparting agent for these thermoplastic resins, a compound containing phosphorus and a compound containing phosphorus and a halogen are known. However, generally these compounds are liquid at room temperature and it is practically difficult to mix a large amount by an ordinary extruder.

As a result of various studies in an effort to obtain a substance suitable as a non-inflammable agent having a large non-inflammability imparting effect, whose heat mixing with the resin is easy and free from the disadvantage of decomposing during heat mixing and coloring and staining the resin and, upon preparation of cellular articles, also being free from the aforementioned disadvantages, the present inventors have discovered that a novel compound represented by the general formula

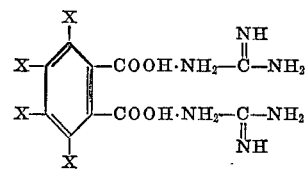

(wherein *x* stands for bromine or chlorine) has very excellent properties as a non-inflammable agent.

One object of the present invention is to provide novel halogenated aromatic compounds. Another object of the present invention is to provide a process for preparing such novel compounds. A further object of the present invention is to provide halogenated aromatic compounds for imparting non-inflammability to thermoplastic resins.

Figure 1:
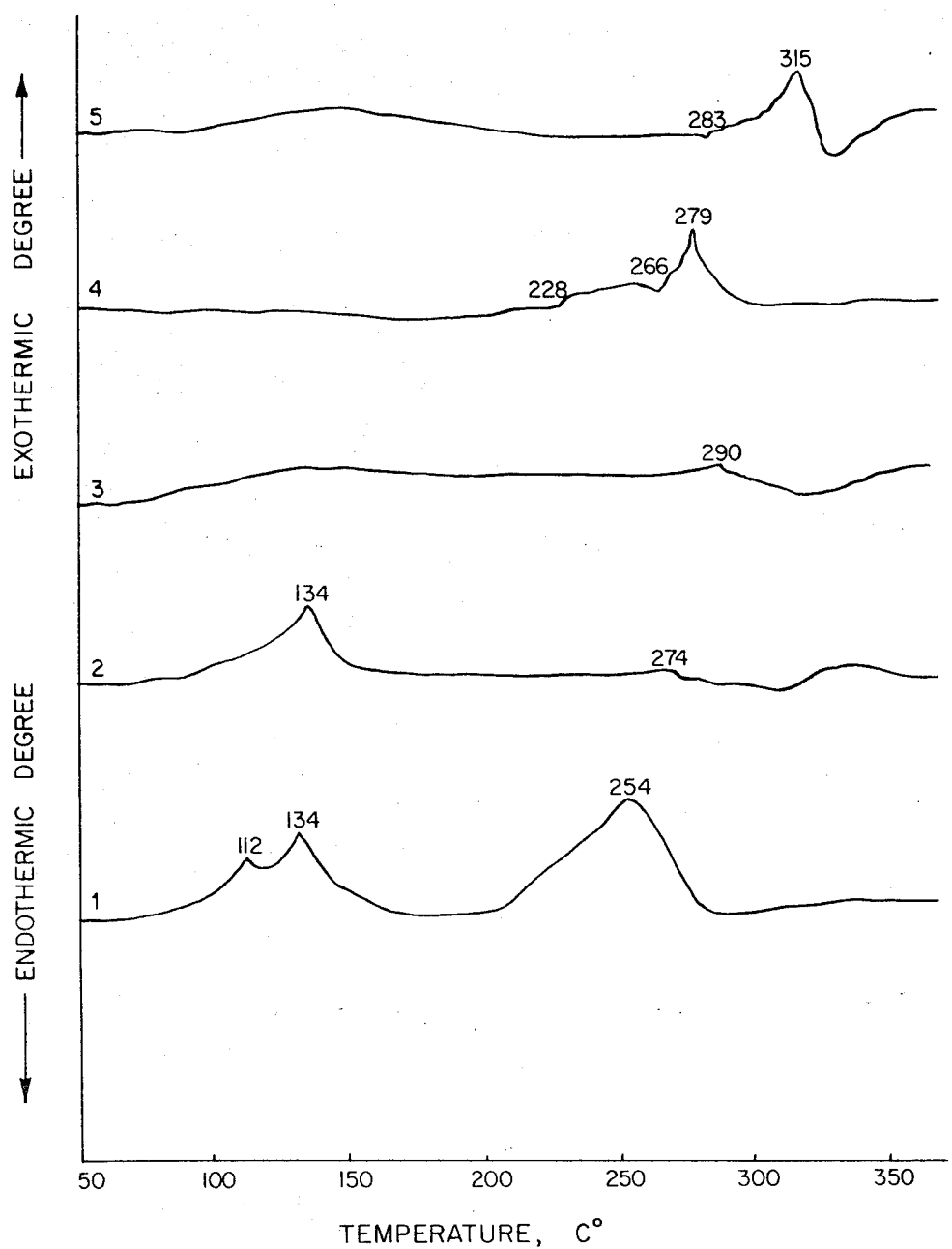
FIG. 1 shows thermal analytical results for various compounds.

The novel compounds of the present invention are shown by the aforementioned general formula and specifically bis-guanidium tetrabromophthalate and bis-guanidium tetrachlorophthalate are representative compounds of the present invention.

The novel compounds of the present invention can be synthesized by the following process.

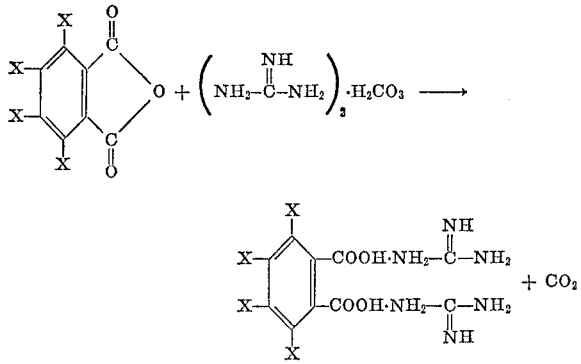

(wherein $x$ stands for bromine or chlorine).

The novel compounds of the present invention are obtained by reacting tetrabromophthalic anhydride or tetrachlorophthalic anhydride with guanidine carbonate. The reaction temperature is at the boiling point of the solvent and the reaction is carried out while refluxing the solvent. The reaction temperature is generally 80–120° C., preferably 100–110° C. When the reaction temperature becomes too high, guanidine carbonate hydrolyzes and urea is produced. Therefore, high temperatures are not preferable.

As a solvent, water and dimethylformamide (content of dimethylformamide: 50–30% by weight), water and acetone (content of acetone: 10–50% by weight) and water and nitrobenzene (content of nitrobenzene: 5–30%) are used.

Normally, based on 100 parts by weight of the solvent, 20–200 parts by weight of the reactive materials are used.

The amounts of tetrabromophthalic anhydride or tetrachlorophthalic anhydride and guanidine carbonate are preferably chemical equivalents; however, either one may be added in a somewhat excess amount. Generally, to a solvent system comprising guanidine carbonate in solution, tetrachlorophthalic anhydride or tetrabromophthalic anhydride is added. When the latter is added, white foam ($CO_2$ gas) is generated as the reaction proceeds.

As to the reaction period, because it depends upon the adding speed of materials there is no particular limitation, however, normally it is about one hour.

The novel compound of the present invention can be also obtained by the following process:

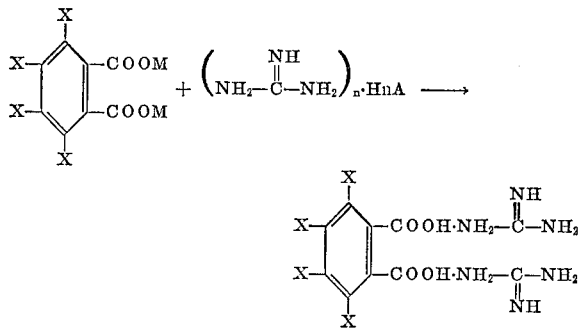

(wherein $x$ stands for bromine or chlorine, M denotes an alkali metal, A stands for a residual group of an inorganic acid and $n$ denotes a positive integer the same as the ionic value of A).

As shown in the aforementioned formula, the novel compound of the present invention can be obtained by the salt exchange reaction of an alkali metal salt of tetrabromophthalate or tetrachlorophthalate with an inorganic acid salt of guanidine. The salt exchange reaction is achieved merely by adding the two components.

As an alkali metal salt of tetrabromophthalate or tetrachlorophthalate, a sodium salt and a potassium salt are used.

As an inorganic acid salt of guanidine, specifically guanidine hydrochloride, guanidine sulfate, guanidine nitrate, guanidine carbonate and guanidine phosphate may be cited.

The aforementioned reaction is achieved simply by adding the two components at room temperature. It is not necessary to heat or cool the reactants.

As a reaction solvent, an aqueous solvent is preferable.

Normally based on 100 parts by weight of the solvent, 20–200 parts by weight of the materials are used.

As to the ratio of alkali metal salt of tetrachlorophthalate or tetrabromophthalate and the inorganic acid salt of guanidine, it is preferable to use them in chemical equivalents. However, either one of them may be added in a somewhat excess amount. The alkali metal salt of tetrachlorophthalate or tetrabromophthalate and the inorganic acid salt of guanidine are both in aqueous solutions. When the aqueous solutions containing the two are mixed, the reaction is immediately carried out.

Because the reaction product is obtained as a white precipitate, it is filtered, washed with water for several times and dried.

The novel compound of the present invention is very effective as a flame retardant agent for thermoplastic resins.

Imparting non-inflammability to a thermoplastic resin using the compounds of the present invention is achieved by mixing 3–30% by weight, preferably 5–20% by weight, of at least one kind of bis-guanidium tetrabromo (or tetrachloro) phthalate with the resin or by applying to the resin a mixture of at least one kind of the compounds of the present invention and a binder having good adhesion to the resin. Where the compound of the present invention is mixed with the thermoplastic resin, mixing can easily be done by a known kneading means using a heated roll, a Banbury mixer or an extruder. On the other hand, when the compounds of the present invention are used as a non-inflammable paint, a binder which has good adhesion to the resin composition can be used. Example of such binder are, solutions of a thermoplastic polymer or a thermosetting polymer such as polyolefins (such as polybutadiene, polyisoprene, neoprene and polyisobutylene), polyvinyl chloride and a copolymer thereof, polyvinyl acetate and a copolymer thereof, polymers of the acrylic series (such as ethyl acrylate, butyl acrylate and methyl methacrylate) chlorosulfonated polyethylene, phenol resin, epoxy resin and urethane resin with solvents such as aromatic compounds (such as benzene, toluene and xylene) and halogenated aliphatic compounds (such as tetrachloroethylene and trichloroethylene).

Normally these are used at the ratio of about 10% to about 30% by weight of the non-inflammable agent composition, about 20% to about 40% by weight of the binder and about 50% to about 70% by weight of the solvent.

When a mixture of the compounds of the present invention and a binder is applied to the surface of a thermoplastic resin composition, known methods such as roll coater, spray coater and hand coating may be used.

The compounds of the present invention develop a sufficient non-inflammable effect when used alone. However, when non-inflammability imparting effect is to be further advanced, the compound may be mixed with a known non-inflammable agent, e.g., antimony-containing compound, phosphorus-containing compound and a compound containing phosphorus and a halogen. Especially when it is combined with an antimony compound such as antimony oxide and antimonyl potassium tartrate, the mixture develops a non-inflammable effect better than that of any of the hitherto known non-inflammability-imparting agents with the same amount. Especially when it is applied to a cellular article having a large contact area with air, its effect is remarkable. While combination of the aforementioned chlorinated paraffin with antimony oxide requires the addition of an amount equal to at least 40% by weight in order to impart sufficient non-inflammability to, e.g. a polyolefine cellulose article, the compound of the present invention in combination with antimony oxide exhibits a sufficient non-inflammability-imparting effect in an amount of 20% by weight. By these compositions it is possible to readily mix and foam a stable thermoplastic resin without damaging the properties inherently possessed by the resin and provide hitherto not realized highly non-inflammable thermoplastic resin compositions and cellular articles.

As a thermoplastic resin whose useful non-inflammable effect is recognized when mixed with the compounds of the present invention, resins of the polyolefin series including homopolymers of $\alpha$-olefin having 1–8 carbon atoms, such as ethylene, propylene, butene-1 and 4-methylpentene-1, a copolymer obtained from mixture of $\alpha$-olefin having 1–8 carbon atoms with less than 50% of at least one kind of a copolymerizable monomer, e.g., vinyl compound such as vinyl acetate and acrylic acid ester and conjugated diene compounds such as butadiene and isoprene and a mixture of thermoplastic resins consisting predominantly of said copolymer, ABS resin consisting of butadiene, styrene, methyl methacrylate and acrylonitrile, polyester resins represented by polyethylene terephthalate, resins of the acrylic series such as polymethylmethacrylate and polymethacrylic acid ester, and resins of the polystyrene series such as polystyrene, poly-$\alpha$-methyl styrene and polyvinyl toluene may be cited. Application of the compounds of the present invention to resins of the polyolefin series is particularly preferable.

As mentioned above, the compounds of the present invention develop an excellent non-inflammable effect when applied to various thermoplastic resins, especially resins of the polyolefin series. At the same time they do not adversely effect the softening temperature characteristics, the brittle temperature characteristics and the mechanical properties of the resin. Further advantageous characteristics of the compounds of the present invention consist of good thermal stability with bromine or chlorine separating in the vicinity of 280° C. and a melting point of about 315° C. Therefore, the compounds of the present invention have excellent properties in that if mixing or foaming is carried out at a temperature below 280° C., thermal deterioration and coloring of the resin do not take place.

FIG. 1 shows differential thermal analytical results of bromine compounds used as non-inflammability imparting agent wherein curve (1) relates to 1,2,3,4-tetrabromobutane, curve (2) relates to tribromoaniline, curve (3) relates to hexabromobenzene, curve (4) relates to tetrabromophthalic anhydride and curve (5) relates to bis-guanidium tetrabromophthalate according to the present invention. Such compounds having a low melting point as tetrabromobutane affects the heat dimensional stability of the obtained resin composition. Tribromoaniline and hexabromobenzene have deficiencies that sublimation is noticeable from 274° C. and 290° C., respectively. Tetrabromophthalic anhydride, which is a raw material of the non-inflammable agent of the present invention, has a melting point 279° C. and bromine begins to separate from about 228° C. Bis-guanidium tetrabromophthalate of the present invention has a melting at 315° C., bromine begins to separate from about 280° C. and is characterized by excellent heat resistance.

Hereinbelow, the present invention will be explained with reference to the following examples.

For information, the non-inflammability test is carried out following the process defined by ASTM D635–59T, namely, a square pillar of one inch square test piece is prepared, which is put between clamps horizontally, and the flame of a Bunsen burner is contacted at one end for ten seconds. In case the test piece does not burn by this process or fire dies out within one inch, it is defined as non-inflammable. In case the flame disappears within a distance of three inches, it is defined as self fire extinguishing, and in the case of self burning the time for burning to a distance of three inches is measured and burning speed is determined.

EXAMPLE 1

Preparation of bis-guanidium tetrabromophthalate 100 g. of water was heated to the boiling point and 30 g. of guanidine carbonate was dissolved therein. After 80 g. of tetrabromophthalic anhydride (molar ratio of guanidine carbonate:tetrabromophthalic anhydride =1:1) was dissolved in 20 g. of dimethyl formamide solvent, this solution was divided and added little by little to the mixture until carbon dioxide was generated. When an amount of the generated gas became small, said anhydride was again added little by little and the operation was repeated. After all of the said anhydride was added, the mixture was boiled until gas did not come out (the reaction temperature was 102–105° C.).

Figure 2:
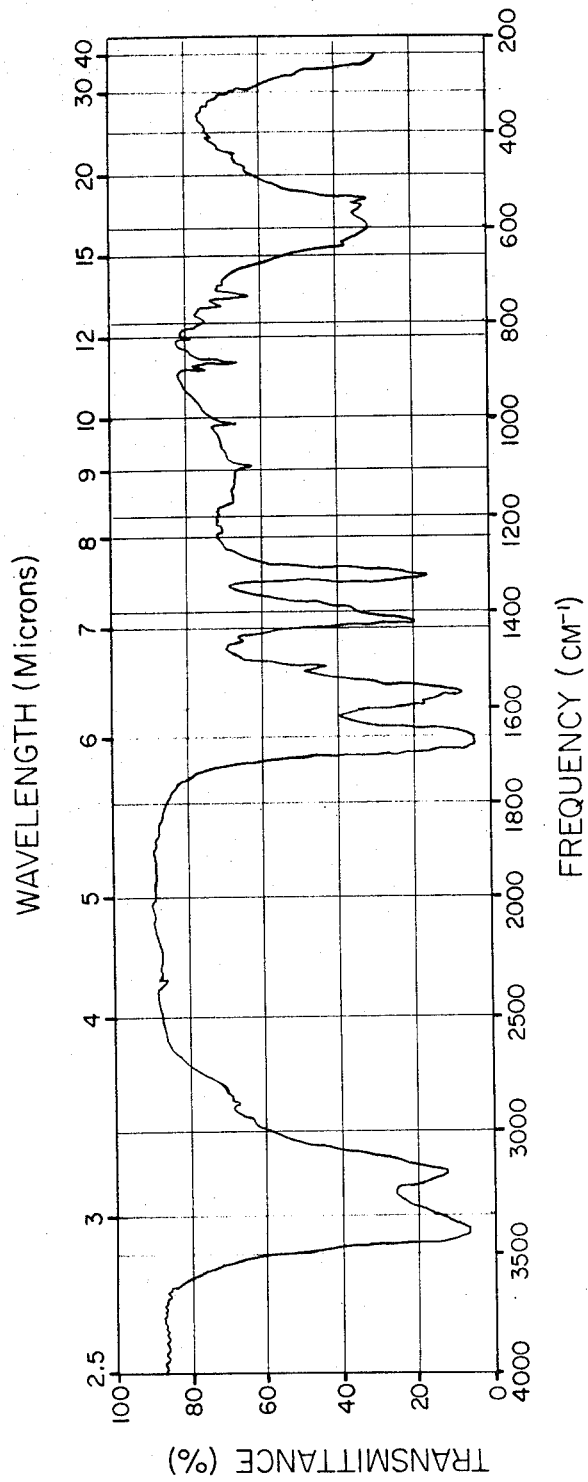
FIG. 2 is an infrared absorption spectrum curve.

When the temperature came down to 80° C., the resulting mixture was filtered by means of a filter cloth (taffeta) and washed with water several times. The white solid thus obtained was dried in a desiccator. 92 g. of bis-guanidium tetrabromophthalate was obtained. The melting point of said compound was 315° C. 3.0 mg. of the obtained white solid was mixed with 300 mg. of KBr and the mixture was moulded under pressure to give a test piece. Using said test piece, infrared absorption spectrum was measured. The results thereof are shown in FIG. 2. At 3400 cm.$^{-1}$ an absorption based on a primary amine (N—H) appeared and at 1670 cm.$^{-1}$ there was an absorption based on a guanidium salt

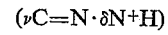

At 1560 cm.$^{-1}$ and 1420 cm.$^{-1}$ absorptions based on an aromatic ring

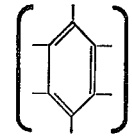

appeared; at 1590 cm.$^{-1}$, an absorption based on carboxylate (—COO—) appeared and at 600 cm.$^{-1}$ and 560 cm.$^{-1}$, absorptions based on (C—Br) were recognized, Results of elementary analysis of the obtained white solid are shown in Table 1.

TABLE 1.—RESULTS OF ELEMENTARY ANALYSIS OF BIS-GUANIDIUM TETRABROMOPHTHALATE

| | Theoretical value (percent) | Experimented value (percent) |
|---|---|---|
| C | 20.1 | 19.7 |
| H | 1.7 | 2.2 |
| N | 14.0 | 13.5 |
| O | 10.7 | 12.7 |
| Br | 53.5 | 51.9 |

EXAMPLE 2

46.4 g. of tetrabromophthalic anhydride was dispersed in 100 g. of water, to which dispersion an aqueous solution containing 8 g. of NaOH was added, and the mixture was completely solubilized in water to obtain a sodium salt of tetrabromophthalic acid, which solution was neutralized by an aqueous solution of HCl. Thereafter to the neutralized solution an aqueous solution containing 20.3 g. of guanidine hydrochloride was added to obtain a white precipitate. This precipitate was filtered by means of a filter cloth and washed with water several times. The filtered precipitate was dried in a desiccator to obtain 53.1 g. of white solid having a melting point of 313° C. The results of elementary analysis of this white solid are shown in Table 2.

TABLE 2.—RESULTS OF ELEMENTARY ANALYSIS

| | Theoretical value (percent) | Experimented value (percent) |
|---|---|---|
| Br | 53.5 | 54.8 |
| C | 20.1 | 19.9 |
| H | 1.7 | 2.0 |
| N | 14.0 | 13.7 |
| O | 10.7 | 9.5 |

NOTE.—Ash component=0.9%. Point where decomposition of Br began=286° C.

EXAMPLE 3

28.6 g. of tetrachlorophthalic anhydride was dispersed in 50 g. of water, to which dispersion 10 g. of NaOH was added to synthesize a sodium salt of tetrachlorophthalic acid, which was dissolved in water and neutralized by an aqueous solution of HCl. 20.3 g. of guanidine hydrochloride was separately dissolved in 50 g. of water, which solution was added to an aqueous solution of sodium tetrachlorophthalate. Immediately a white precipitate was produced, which was filtered by means of a filter paper and washed with water several times. When the white compound was dried, 40.8 g. of bis-guanidium tetrachlorophthalate having a melting point of 296° C. was obtained. The results of elementary analysis of said compound are shown in Table 3.

TABLE 3

| Elementary analysis | Experimented value (percent) | Theoretical value (percent) |
|---|---|---|
| C | 28.8 | 28.1 |
| H | 4.0 | 4.2 |
| N | 19.2 | 19.6 |
| O | 15.2 | 15.0 |
| Cl | 32.8 | 33.2 |

NOTE.—Point where decomposition of Cl began=275° C.

EXAMPLE 4

23.2 g. of tetrabromophthalic anhydride was dispersed in 60 g. of water, to which dispersion an aqueous solution of 4 g. of NaOH was added, and the entire mixture was completely solubilized in water to obtain a sodium salt of tetrabromophthalic acid, which solution was neutralized by an aqueous solution of HCl. Thereafter, to the neutralized solution, an aqueous solution obtained by dissolving 9 g. of guanidine carbonate in 20 g. of water was added to obtain a white precipitate. Said precipitate was filtered by means of a filter cloth and washed with water several times. The precipitate was dried in a desiccator to obtain 28.4 g. of a white powder having a melting point of 315° C. By repeating washing with water it was possible to reduce the ash component to below 0.1%. The part dissolved in water was below 0.5%.

An example using the compound of the present invention as a non-inflammable agent will now be shown.

EXAMPLE 5

With 81 parts of high density polyethylene, Hizex 2100 GP (manufactured by Mitsui Petrochemical Co.), 13 parts of bis-guanidium tetrabromophthalate and 6 parts of antimony trioxide were mixed at 160° C. for fifteen minutes using a hot roll to obtain a sufficiently uniform composition. Said composition was press moulded at 180° C. to make a 25 mm. wide, 25 mm. thick and 150 mm. long test piece. When its one end was contacted with a flame of a Bunsen burner, it burned in the fire flame but when it was taken away from the flame, the fire died out within one second.

EXAMPLE 6

With 80 parts of high density polyethylene, Hizex 2100 GP (manufactured by Mitsui Petrochemical Co.), 10 parts of a foaming agent, azodicarbonamide, 0.8 part of a chemical cross-linking agent, dicumyl peroxide and as non-inflammable agent 13 parts of bis-guanidium tetrabromophthalate and 7 parts of antimony trioxide were mixed at 110° C. by a hot roll, and the mixture was made into chips. Said chips were put in a metal mould, hot pressed at 210° C. under a pressure of 100 kg./cm.$^2$ for fifteen minutes, then the pressure was reduced to foam, and a cellular article having a specific gravity of 0.046 was obtained. Said cellular article was tested according to the process of ASTM D635-59T. The fire died out in two seconds (non-inflammable).

COMPARATIVE EXAMPLE 1

With 65 parts of low pressure-process polyethylene Mirason No. 16 (manufactured by Mitsui Polychemical Co.), 20 parts of chlorinated paraffin, 15 parts of antimony trioxide, 10 parts of a foaming agent, azodicarboamide and 0.8 part of a chemical cross-linking agent, dicumyl peroxide, were mixed at 110° C. by a hot roll for fifteen minutes and the mixture was made into chips. Said chips were put into a metal mould, hot pressed at 210° C. under a pressure of 100 kg./cm.$^2$ for fifteen minutes. Thereafter the pressure was reduced to foam. A foam having a specific gravity of 0.048 was obtained. In testing said foam the fire died out of itself at a burning distance of one inch in the aforementioned non-inflammability test (self-fire extinguishing). In order to make it so-called non-inflammable (dying out of fire of itself within three seconds), it was necessary to add at least 40% by weight of chlorinated paraffin and antimony trioxide.

EXAMPLE 7

With 100 parts of high pressure-process polyethylene, Mirason No. 16 (manufactured by Mitsui Polychemical Co.), 18 parts of a foaming agent, azodicarboamide, 20 parts of bis-guanidium tetrabromophthalate and 8 parts of antimony trioxide were blended by a Henschel mixer, and the blend was made into sheet at an extruding temperature of 140° C. To said sheet 7 M rads of radial rays were irradiated from both sides and said sheet was foamed above a salt bath at 230° C. by infrared heating process. A white foam having an apparent specific gravity of 0.043 and an average foam diameter of 0.4 mm. was obtained. When a non-inflammability test was carried out on this foam after ASTM D635-59T, it burned in a flame of a Bunsen burner, but when it was taken away from the flame, the fire died out within three seconds (non-inflammability).

COMPARATIVE EXAMPLE 2

Instead of bis-guanidium tetrabromophthalate in Example 7, tetrabromophthalic anhydride was added and foamed at 230° C. As a result there was a deficiency in that the surface of the foam was colored yellow.

EXAMPLE 8

With 50 parts of high density polyethylene Hizex 2100 GP (manufactured by Mitsui Petrochemical Co.), 50 parts of an ethylene-vinyl acetate copolymer, Enaflex No. 560 (manufactured by Mitsui Polychemical Co.), 15 parts of bis-guanidium tetrabromophthalate, 10 parts of antimony trioxide and 15 parts of a foaming agent, azodicarboamide and 1 part of a chemical cross-linking agent, 2.5-dimethyl-2.5-di(t-butylperoxy)hexene were mixed at 120° C., by a hot roll and the mixture was made into chips. This chipped composition was put in a metal mould and hot pressed at 210° C. under a pressure of 100 kg./cm.$^2$ for fifteen minutes. The pressure was reduced and a foam having a specific gravity of 0.043 was obtained. In said non-inflammability test using said foam, the fire died out within two seconds (non-inflammability).

EXAMPLE 9

12 parts of Hiparon 30 (product of Du Pont chlorosulfonated polyethylene), 21 parts of bis-guanidium tetrabromophthalate, 8 parts of tetrabromobisphenol A and 6 parts of antimony trioxide were uniformly mixed with a toluene-triolene mixture solvent using three mixing rolls. To a square pillar of 30-time foamed polyethylene foam, said mixture was applied in a solid amount of 30 g./m.² When the applied surface was contacted with a flame of a Bunsen burner, it burned in the flame but when it was taken away from the flame the fire died out within three seconds.

EXAMPLE 10

With 100 parts of high pressure-process polyethylene (specific gravity=0.92, MI=3.4), 20 parts of bis-guanidium tetrachlorophthalate and 10 parts of antimony trioxide were thoroughly mixed at 120° C. by means of a hot roll. The mixture was put in a metal mould and a moulded sample was produced by hot pressing at 180° C. under a pressure of 100 kg./cm.² for ten minutes. Said sample was subjected to a combustion test as set forth in ASTM D635–59T. As a result, the fire died out after two seconds.

EXAMPLE 11

To 100 parts of Styron 666 resin (polystyrene) manufactured by The Dow Chemical Company, 10 parts of bis-guanidium tetrabromophthalate and 8 parts of antimony trioxide were added and the mixture was well mixed at 120° C. by a hot roll. Said mixture was injection moulded by a projection moulder at a cylinder temperature of 180° C. and under an injection pressure of 100 kg./cm.² to obtain a moulded sample. Said sample was subjected to a non-inflammable test as set forth in ASTM D635–59T. As a result, the sample burned in a flame of a Bunsen burner. However, when it was taken away from the flame, the fire died out within three seconds (non-inflammability).

For comparison, e.g., in the system of chlorinated paraffin and antimony trioxide, the sample melted and the fire failed to die out. However, in the case of the compound of the present invention, the sample was carbonized and the fire died out.

EXAMPLE 12

With 100 parts of ABS resin, Cycolac L manufactured by Marbon Chemical Co., 10 parts of bis-guanidium tetrabromophthalate and 5 parts of antimony trioxide were mixed in a 30 cm. diameter extruder at a cylinder temperature of 250° C. and the mixture was pelletized. Said pellets were injection moulded by a 2 oz. screw-in-line injection moulder at a cylinder temperature of 240° C. and a mould temperature of 70° C. under an injection pressure of 200 kg./cm.² to obtain a moulded sample. Said sample was subjected to a non-inflammable test as set forth in ASTM D635–59T. As a result, it burned in a flame of a Bunsen burner, but when the flame was taken away, the fire died out within three seconds.

EXAMPLE 13

As a process for measuring a degree of non-inflammability, there is a process of measuring limiting oxygen contents according to Canale process [C. P. Fenimore, Comb & Flame, 16, No. 2, 135 (1966)].

Figure 3:
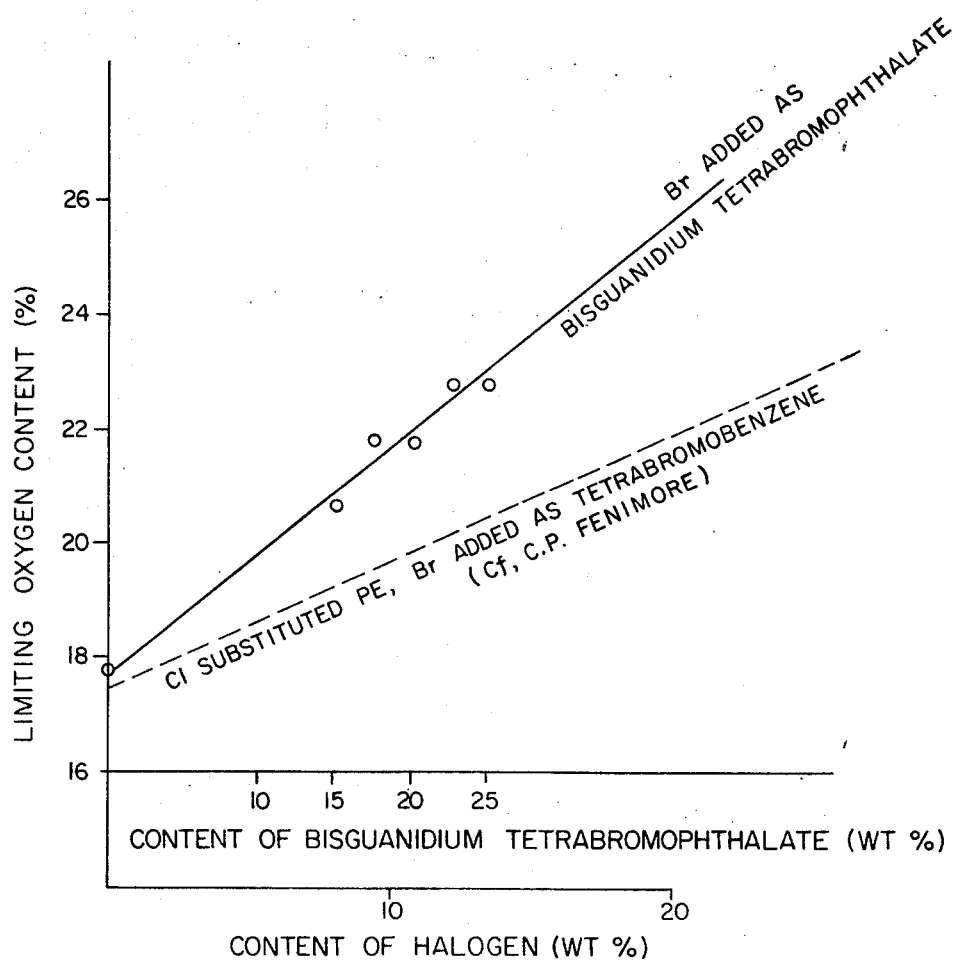
FIG. 3 is a graph showing limiting oxygen content for polyethylenes containing halogens.

To a high pressure-process polyethylene (specific gravity=0.92, MI=3.4), a predetermined amount of bis-guanidium tetrabromophthalate was added and mixed and limiting oxygen contents were measured. The results were as shown in FIG. 3. From this drawing, it was known that limiting oxygen contents were raised by about 0.21% based on 1% by weight of bis-guanidium tetrabromophthalate and limiting oxygen contents were raised by about 0.4%, based on 1% by weight of a halogen (Br).

C. P. Fenimore reported in an experimental report that in polyethylene added with chlorinated polyethylene and tetrabromobenzene, respectively, raising effects of limiting oxygen contents based on 1% by weight of a halogen both became about 0.22%. When compared with this result, it was demonstrated that the compounds of the present invention exhibited about twice the non-inflammable effect based on a halogen (Br).

We claim:
1. Compounds of the formula

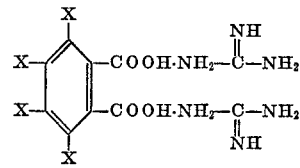

wherein $x$ is selected from the group consisting of chlorine and bromine.

References Cited
UNITED STATES PATENTS 2,534,477    9/1950    Nagy _____ 260—501.14

HOWARD T. MARS, Primary Examiner

M. W. GLYNN, Assistant Examiner

U.S. Cl. X.R.

260—Dig. 24, 45.7 R; 252—8.1